United States Patent
Zourob et al.

(10) Patent No.: US 11,960,691 B2
(45) Date of Patent: Apr. 16, 2024

(54) METHOD AND APPARATUS FOR INTERFACING WITH A TOUCH SENSOR

(71) Applicant: Telefonaktiebolaget LM Ericsson (publ), Stockholm (SE)

(72) Inventors: Mohammed Zourob, London (CA); Alexander Hunt, Tygelsjö (SE); Andreas Kristensson, Södra Sandby (SE); Mohammed Abdulaziz, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/255,472

(22) PCT Filed: Dec. 17, 2020

(86) PCT No.: PCT/EP2020/086794
§ 371 (c)(1),
(2) Date: Jun. 1, 2023

(87) PCT Pub. No.: WO2022/128104
PCT Pub. Date: Jun. 23, 2022

(65) Prior Publication Data
US 2024/0036691 A1    Feb. 1, 2024

(51) Int. Cl.
G06F 3/044    (2006.01)
G06F 3/041    (2006.01)

(52) U.S. Cl.
CPC .......... *G06F 3/0446* (2019.05); *G06F 3/0418* (2013.01)

(58) Field of Classification Search
CPC .............................. G06F 3/0418; G06F 3/0446
See application file for complete search history.

(56) References Cited

U.S. PATENT DOCUMENTS

| 8,022,317 B2 | 9/2011 | Ely |
| 2011/0175835 A1 | 7/2011 | Wang |

(Continued)

FOREIGN PATENT DOCUMENTS

| EP | 2372504 A2 | 10/2011 |
| KR | 101582597 B1 | 1/2016 |
| KR | 102081809 B1 | 2/2020 |

OTHER PUBLICATIONS

An, Jae-Sung , et al., "A 3.9-kHz Frame Rate and 61.0-dB SNR Analog Front-End IC With 6-bit Pressure and Tilt Angle Expressions of Active Stylus Using Multiple-Frequency Driving Method for Capacitive Touch Screen Panels", IEEE Journal of Solid-State Circuits, vol. 53, No. 1, Jan. 2018, 17 pages.

*Primary Examiner* — Muhammad N Edun
(74) *Attorney, Agent, or Firm* — Murphy, Bilak & Homiller, PLLC (57) ABSTRACT

A technique for reading the columns (12) and rows (14) of a touch sensor (10) provides several advantages, including scalability to touch sensors with high column/row counts. A simultaneously applied set of column input signals (24) yields a corresponding set of column output signals (34) that are combined into a combined column signal (38) that is transformed into the frequency domain after digitization, to yield column values (48) corresponding to the respective touch sensor columns (12). The same process applied with respect to the touch sensor rows (14) yields a set of row values (50), with evaluation of the frequency-domain column and row values (48, 50) providing the basis for detecting touch inputs to the touch sensor (10).

22 Claims, 6 Drawing Sheets

(56) References Cited

U.S. PATENT DOCUMENTS

| | | |
|---|---|---|
| 2013/0176270 A1 | 7/2013 | Cattivelli et al. |
| 2015/0035768 A1* | 2/2015 | Shahparnia ............ G06F 3/044 |
| | | 345/173 |
| 2015/0091858 A1* | 4/2015 | Rosenberg .......... G06F 3/04144 |
| | | 345/174 |
| 2015/0091859 A1 | 4/2015 | Rosenberg et al. |
| 2015/0309610 A1 | 10/2015 | Rabii et al. |
| 2016/0162011 A1 | 6/2016 | Verma et al. |
| 2016/0195990 A1 | 7/2016 | Han et al. |
| 2016/0259467 A1 | 9/2016 | Nayyar et al. |
| 2017/0199022 A1 | 7/2017 | Anderson et al. |
| 2017/0199626 A1 | 7/2017 | D'Souza |
| 2017/0344174 A1* | 11/2017 | Pant ..................... G06F 3/0441 |
| 2018/0329563 A1 | 11/2018 | Han et al. |
| 2019/0050102 A1 | 2/2019 | Johnson et al. |
| 2019/0138148 A1 | 5/2019 | Kwon |
| 2020/0050320 A1 | 2/2020 | Yang et al. |
| 2020/0326795 A1 | 10/2020 | Chang et al. |

\* cited by examiner

METHOD AND APPARATUS FOR INTERFACING WITH A TOUCH SENSOR

TECHNICAL FIELD

The invention relates to touch sensors and particularly relates to interfacing with touch sensors.

BACKGROUND

Touch sensors find widespread use, in everything from laptops and other personal computing devices, such as smartphones and tablets, to banking terminals, point-of-sale terminals, etc. Interfacing with touch sensors imposes several challenges, such as balancing the amount and complexity of the interface circuitry against performance and cost. Here, "performance" refers to the time required for reading the touch sensor to determine whether or where the touch surface of the touch sensor is being touched.

One approach to simplifying and lowering the cost of the interface circuitry relates to how "reading" is implemented. Consider a typical touch sensor implementation in which the touch sensor comprises or is otherwise embedded in a display screen of an electronic device and is arranged as a set of intersecting columns and rows and where reading the touch sensor requires sensing the individual column and row signals from the touch sensor.

As an example arrangement involving capacitive touch sensor technology, a capacitive touchscreen comprises parallel glass plates with an X-Y grid of capacitors formed therebetween, to form intersecting screen columns and screen rows. A touch input to the top glass plate—the touch surface—alters the capacitance of the underlying or proximate capacitors, which alters the voltage of an excitation signal applied to the affected columns/rows. Reading such a touch sensor may be accomplished by digitizing the voltage of the excitation signal as taken from each column and each row and evaluating the digitized voltages, where each column and each row comprises a "line" of capacitors in the X-Y grid.

Reading the individual columns and rows one at a time in a "scanning" fashion minimizes and simplifies the interface circuitry, e.g., by allowing the same analog-to-digital converter (ADC) to be used for digitizing the signal from each respective column and row. However, reading columns and rows one at a time results in scan times that increase directly with the number of columns and/or rows comprised in the touch sensor. Consequently, the approach does not scale well for larger screen sizes and higher touch resolutions. Adding additional ADCs, e.g., one per column or row offers obvious reductions in scan times, albeit at much greater cost, increased power consumption, and increased size.

SUMMARY

A technique for reading the columns and rows of a touch sensor provides several advantages, including scalability to touch sensors with high column/row counts. A simultaneously applied set of column input signals yields a corresponding set of column output signals that are combined into a combined column signal that is transformed into the frequency domain after digitization, to yield column values corresponding to the respective touch sensor columns. The same process applied with respect to the touch sensor rows yields a set of row values, with evaluation of the frequency-domain column and row values providing the basis for detecting touch inputs to the touch sensor.

An example touch sensor has columns and rows forming a row-column grid and, in one embodiment, a method of reading the touch sensor includes applying a set of column input signals simultaneously to respective column inputs of the touch sensor. Each column input signal is an analog signal at a respective frequency and the method further includes combining column output signals taken from respective column outputs of the touch sensor to form a combined column signal. Each column output signal corresponds to a respective one of the column input signals but is altered in amplitude in dependence on whether the touch sensor is being touched in a vertical screen region corresponding to the respective column of the touch sensor. The method further includes applying a set of row input signals simultaneously to respective row inputs of the touch sensor, where each row input signal is an analog signal at a respective frequency, and combining row output signals taken from respective row outputs of the touch sensor to form a combined row signal. Each row output signal corresponds to a respective one of the row input signals but is altered in amplitude in dependence on whether the touch sensor is being touched in a horizontal screen region corresponding to the respective row of the touch sensor. Still further, the method includes performing a frequency-domain transform on digitized samples of the combined column signal and on digitized samples of the combined row signal, to obtain, respectively, a set of column values that depend on the amplitudes of the column output signals in the combined column signal, and a set of row values that depend on the amplitudes of the row output signals in the combined row signal, and detecting a touch input to the touch sensor by evaluating the column values and the row values.

In another embodiment, an apparatus is configured for reading a touch sensor having columns and rows forming a row-column grid. The apparatus includes first multiplexing circuitry that is configured to apply a set of column input signals simultaneously to respective column inputs of the touch sensor, where each column input signal is an analog signal at a respective frequency, and apply a set of row input signals simultaneously to respective row inputs of the touch sensor, where each row input signal is an analog signal at a respective frequency. The apparatus further includes second multiplexing circuitry configured to combine column output signals taken from respective column outputs of the touch sensor to form a combined column signal, where each column output signal corresponds to a respective one of the column input signals but is altered in amplitude in dependence on whether the touch sensor is being touched in a vertical screen region corresponding to the respective column of the touch sensor. The second multiplexing circuitry is also configured to combine row output signals taken from respective row outputs of the touch sensor to form a combined row signal, where each row output signal corresponds to a respective one of the row input signals but is altered in amplitude in dependence on whether the touch sensor is being touched in a horizontal screen region corresponding to the respective row of the touch sensor. Further, the apparatus includes processing circuitry configured to perform a frequency-domain transform on digitized samples of the combined column signal and on digitized samples of the combined row signal, to obtain, respectively, a set of column values that depend on the amplitudes of the corresponding column output signals in the combined column signal, and a set of row values that depend on the amplitude of the corresponding row output signals in the combined row signal, and detect a touch input to the touch sensor by evaluating the column values and the row values.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
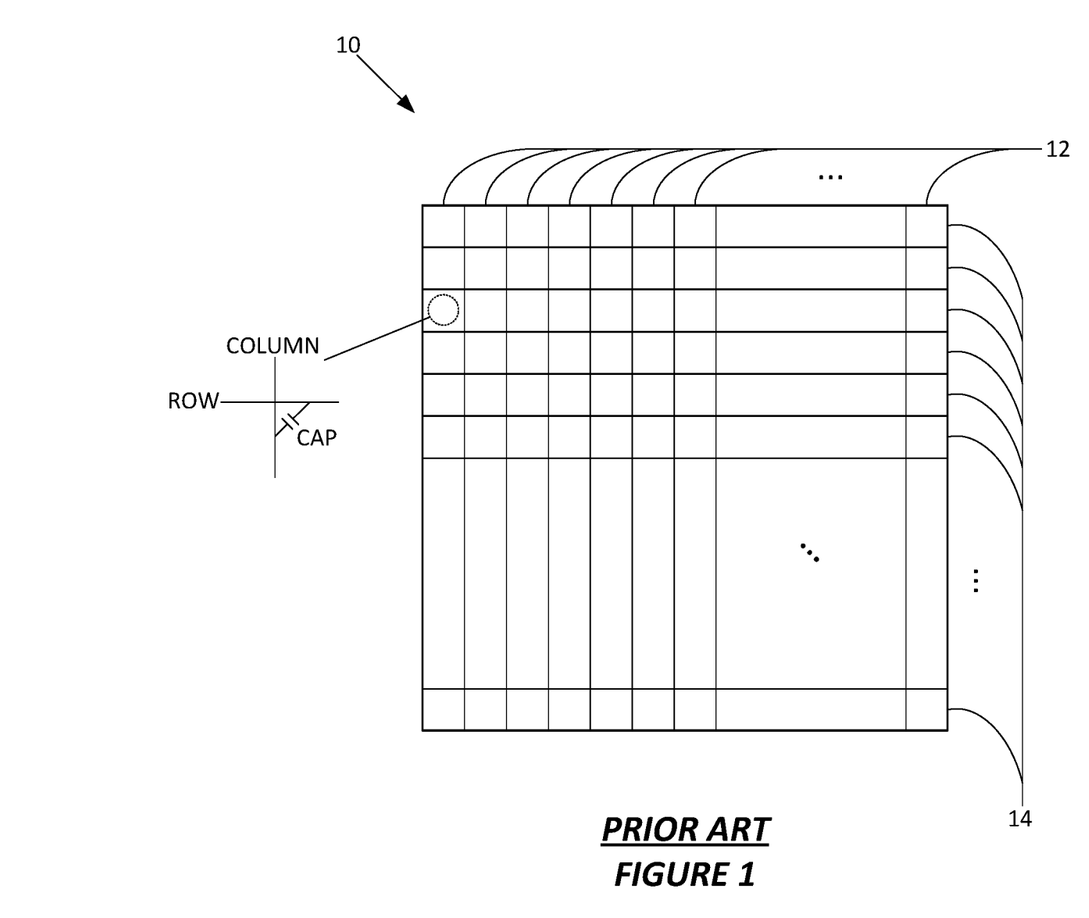
FIG. 1 is a block diagram of an example touch sensor.

FIG. 1 illustrates an example touch sensor 10, shown by way of example with capacitive touch sensing. However, one or more embodiments of an interface apparatus and a reading method as disclosed herein have applicability to any touch sensor outputs analog output signals for detecting touch inputs with respect to a row/column grid of the touch sensor.

A number of columns 12 and a number of rows 14 "divide" the touch surface of the touch sensor 10 into a grid, and provide a basis for detecting the X-Y location of touch inputs on the touch surface, in dependence on applying excitation signals to the touch sensor 10 and evaluating the corresponding output signals from the touch sensor 10.

For example, in a given capacitive-sensing embodiment of the touch sensor 10, the touch sensor 10 is a capacitive touchscreen having a touch surface overlaying a capacitive sensing grid formed by columns 12 and rows 14. Each column 12 and row 14 may be a capacitor line with the excitation signal applied to one end of the line and the output signal taken from the other end of the line. For any given column 12 or row 14, the amplitude of output signal is altered relative to the amplitude of the excitation signal in dependence on whether a finger or other conductive item is touching the touch sensor 10 anywhere within the region associated with the column 12 or row 14. Similarly, touch-based changes in resistance also produce amplitude/voltage changes, in resistive-based touch sensors.

Figure 2:
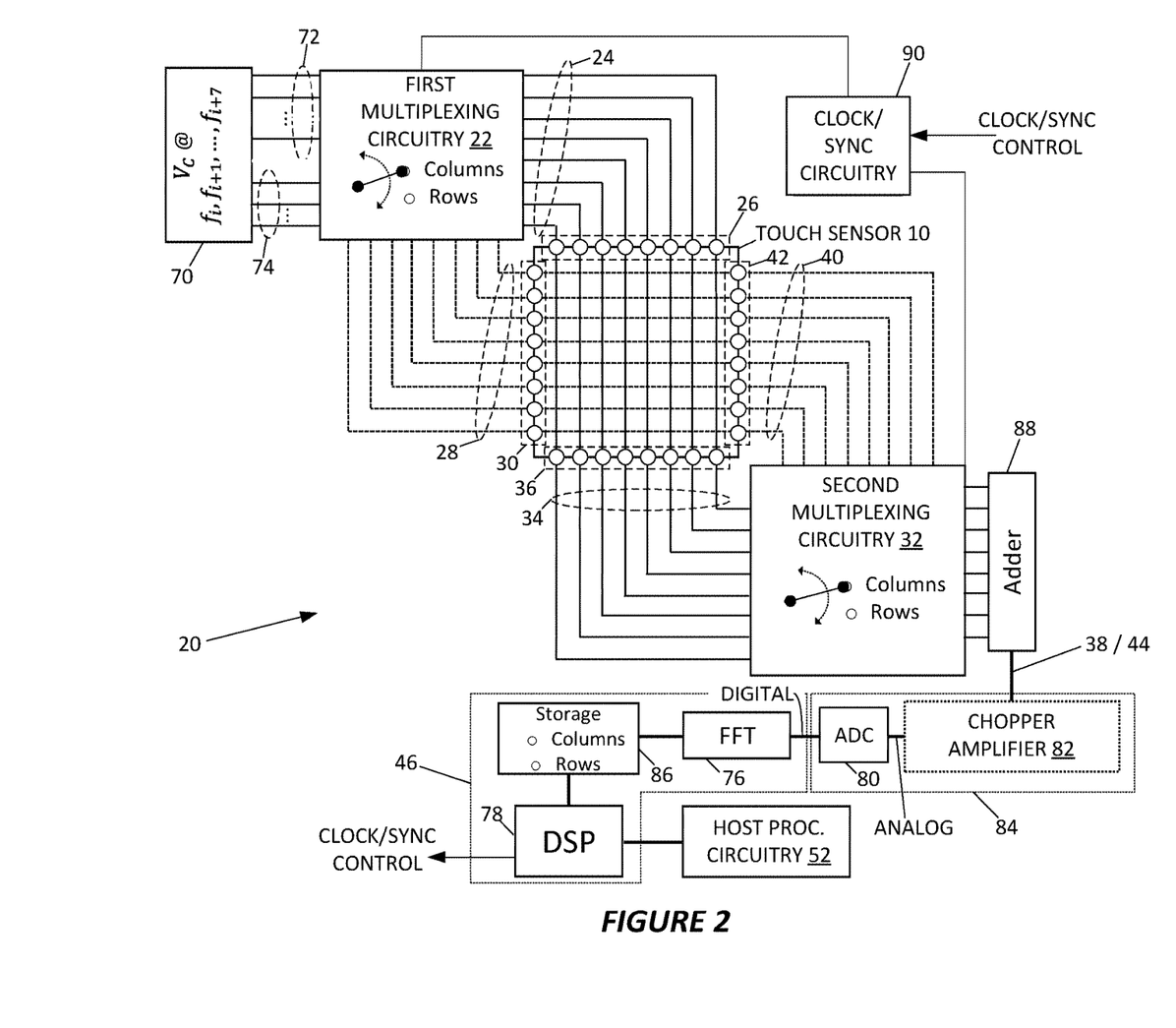
FIG. 2 is a block diagram of an apparatus for reading a touch sensor, according to one embodiment.

FIG. 2 depicts one embodiment of an apparatus 20 for reading a touch sensor 10, where the apparatus 20 offers a number of advantages, such as minimizing component count while providing for simultaneous reading of all columns 12 and simultaneous reading of all rows 14 of the touch sensor 10. Simultaneous reading means that the apparatus 20 performs well even in cases where the touch sensor 10 has high column/row counts and, on that point, the illustrated numbers of columns 12 and rows 14 are non-limiting examples; greater or lesser numbers of columns 12 and/or rows 14 may be used.

In more detail, the apparatus 20 is configured for reading a touch sensor 10 having columns 12 and rows 14 forming a row-column grid, with the apparatus 20 including first multiplexing circuitry 22 that is configured to: (a) apply a set of column input signals 24 simultaneously to respective column inputs 26 of the touch sensor 10, each column input signal 24 being an analog signal at a respective frequency; and (b) apply a set of row input signals 28 simultaneously to respective row inputs 30 of the touch sensor 10, each row input signal 28 being an analog signal at a respective frequency. Equivalently, the apparatus 20 is configured to apply the row input signals 28 and then apply the column input signals 24—i.e., the apparatus 20 may be configured to read the columns 12 and then the rows 14 or vice versa.

The apparatus 20 further includes second multiplexing circuitry 32 that is configured to: (a) combine column output signals 34 taken from respective column outputs 36 of the touch sensor 10 to form a combined column signal 38, each column output signal 34 corresponding to a respective one of the column input signals 24 but altered in amplitude in dependence on whether the touch sensor 10 is being touched in a vertical screen region corresponding to the respective column 12 of the touch sensor 10; and (b) combine row output signals 40 taken from respective row outputs 42 of the touch sensor 10 to form a combined row signal 44, each row output signal 40 corresponding to a respective one of the row input signals 28 but altered in amplitude in dependence on whether the touch sensor 10 is being touched in a horizontal screen region corresponding to the respective row 14 of the touch sensor 10.

In one example, each column input 26 is one end of a conductive line that runs in a columnar orientation through the touch sensor and each column output 36 is the other end of that same conductive line. As such, one or more electrical characteristics of the column output signal 34 from any given column output 36 deviates from the same one or more electrical characteristics of the corresponding column input signal 24 in dependence on whether there are any touch inputs to the touch sensor in or proximate to the region defined by the involved column 12. For example, in the absence of any touch inputs in the involved screen region, a given column output signal 34 is the same as corresponding column input signal 24 subject to minor deviations associated with parasitic losses, for example. However, in the presence of one or more touch inputs in the involved screen region, one or more electrical characteristics of the column output signal 34 deviate from those of the column input signal 24 e.g., touch inputs alter the amplitude of the column output signal 34. The same or similar operational details apply to the row input signals 28 and the corresponding row output signals.

Turning to further example details in FIG. 2, the apparatus 20 includes processing circuitry 46 that is configured to: (a) perform a frequency-domain transform on digitized samples of the combined column signal 38 and on digitized samples of the combined row signal 44, to obtain, respectively, a set of column values 48 that depend on the amplitudes of the corresponding column output signals 34 in the combined column signal 38, and a set of row values 50 that depend on the amplitude of the corresponding row output signals 40 in the combined row signal 44; and (b) detect a touch input to the touch sensor 10 by evaluating the column values 48 and the row values 50.

For example, in one or more embodiments, the processing circuitry 46 is configured to evaluate the column values 48 and the row values 50 to detect the touch input by detecting deviations among the column values 48 and deviations among the row values 50. To detect deviations among the column values 48 and deviations among the row values 50, the processing circuitry 46 according to at least one embodiment is configured to determine that one or more of the column values 48 deviate from a nominal column value or with respect to one or more other ones of the column values 48 and determine that one or more of the row values 50 deviate from a nominal row value or with respect to one or more other ones of the row values 50.

The processing circuitry 46 in one or more embodiments is configured to interface with host processing circuitry 52 of an incorporating apparatus 54 that incorporates the touch sensor 10 and the apparatus 20. As a non-limiting example, the incorporating apparatus 54 is a computing device, such as a laptop, tablet, or smartphone.

The processing circuitry 46 includes, for example, a Fast Fourier Transform (FFT) circuit 76 that is configured to perform the frequency-domain transform on the digitized samples of the combined column signal 38 and the digitized samples of the combined row signal 44 as one or more FFTs. The processing circuitry 46 in this example arrangement further includes a computer processor 78 that integrates or is otherwise operatively coupled to the FFT circuit 76 and is configured to evaluate the column values 48 and the row values 50 generated by the FFT circuit 76.

In at least one embodiment, the first multiplexing circuitry 22 is configured to apply the set of column input signals 24 during a first interval and correspondingly obtain the digitized samples of the combined column signal 38 via an analog-to-digital converter (ADC) 80 of the apparatus 20, and apply the set of row input signals 28 during a second interval that does not overlap with the first interval and correspondingly obtain the digitized samples of the combined row signal 44 via the ADC 80. Of course, "first" and "second" as used here may be understood as labels for differentiating the multiplexed row/column reading of the touch sensor 10 and the read cycle used by the apparatus 20 for each "reading" of the columns 12 and rows 14 may involve reading the columns 12 or the rows 14 "first" in a temporal sense within each read cycle. Here, a "read cycle" may be understood as the overall collection of operations performed by the apparatus 20 for sensing the state or condition of the respective column output signals 34 and the respective row output signals 34 at a given time, for touch detection.

In at least one embodiment of the apparatus 20, the respective frequencies of the column input signals 24 are distinct from the respective frequencies of the row input signals 28. For example, the first multiplexing circuitry 22 uses a first set of excitation signals 72 as the column input signals 24 and uses a second set of excitation signals 74 as the row input signals 28. With this arrangement, to perform the frequency-domain transform, the processing circuitry 46 is configured to buffer the digitized samples of the combined column signal 38 in a buffer 86 together with the digitized samples of the combined row signal 44 as an overall set of digitized samples, and perform a single Fast Fourier Transform (FFT) on the overall set of digitized samples.

In another embodiment, the respective frequencies of the column input signals 24 are the same as the respective frequencies of the row input signals 28. Correspondingly, to perform the frequency-domain transform, the processing circuitry 46 is configured to perform a first FFT on the digitized samples of the combined column signal 38, and perform a second FFT on the digitized samples of the combined row signal 44. For example, there may be one set of excitation signals 72, with the first multiplexing circuitry 22 "reusing" that same set of excitation signals 72 for both the column input signals 24 and the row input signals 28. With this reuse, the individual excitation signal frequencies corresponding to the respective columns 12 are the same as those corresponding to the respective rows 14, hence requiring separate frequency-domain transforms with respect to the digitized samples of the combined column signal 38 and the digitized samples of the combined row signal 44.

With the immediately above details in mind, the first multiplexing circuitry 22 in one or more embodiments is configured to apply the set of column input signals 24 and apply the set of row input signals 28 by multiplexing a common set of excitation signals 72 for application to the respective column inputs 26 during a first interval and application to the respective row inputs 30 during a second interval. Note that clock/sync circuitry 90 may provide clocking/syncing control signals to one or both the first and second multiplexing circuitry 22 and 32. In turn, the processing circuitry 46 may be configured to control the clock/sync circuitry 90.

In further illustrated details, the second multiplexing circuitry 32 includes or is associated with a summing circuit 88 that is configured to form either the combined column signal 38 or the combined row signal 44, based on multiplexing either the column output signals 34 or the row output signals 40 into the summing circuit 88. Further, in one or more embodiments, the apparatus 20 includes a chopper amplifier 82 that is configured or otherwise operative to reduce noise in the combined column signal 38 and in the combined row signal 44, in advance of obtaining the digitized samples of the combined column signal 38 and the digitized samples of the combined row signal 44. In other embodiments, the apparatus 20 omits the chopper amplifier 82.

The chopper amplifier 82 may be advisable in cases where the voltage on the lines is reduced for a low energy consumption because it reduces "flicker noise", which may be dominant with certain semiconductor technologies that provide high sensitivity and low-power operation. For example, if the voltage level is high such that the voltage represented by one Least-Significant-Bit (LSB) is still higher than the noise floor, the chopper amplifier 82 may be omitted without degrading ADC performance.

Figure 3A:
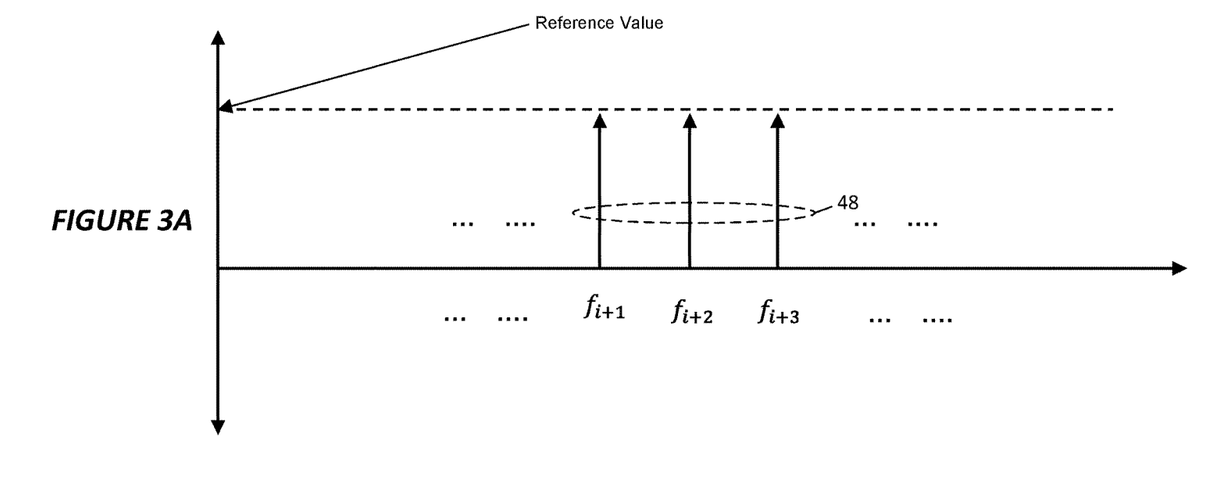
FIGS. 3A/3B and 4A/4B are plots of example column and row values, respectively, produced and evaluated by the apparatus of FIG. 2.

FIG. 3A illustrates an example of the column values 48 obtained by applying a frequency-domain transform to the digitized samples of the combined column signal 38, e.g., as obtained in one "cycle" of reading the touch sensor 10. Specifically, FIG. 3A presupposes the absence of touch inputs to the touch sensor 10 and, correspondingly, the column values 48 are all at a nominal or reference value. That is, the column value 48 corresponding to the column output signal 34 at the excitation-signal frequency $f_{i+1}$ is at the nominal or reference amplitude, meaning that the column output signal 34 at the excitation-signal frequency $f_{i+1}$ was not altered in amplitude relative to the corresponding column input signal 24. The same holds true for the other column output signals 34 represented in the digitized samples of the combined column signal 38, e.g., those at the remaining excitation frequencies $f_{i+2}$, $f_{i+3}$, and so on.

Figure 3B:
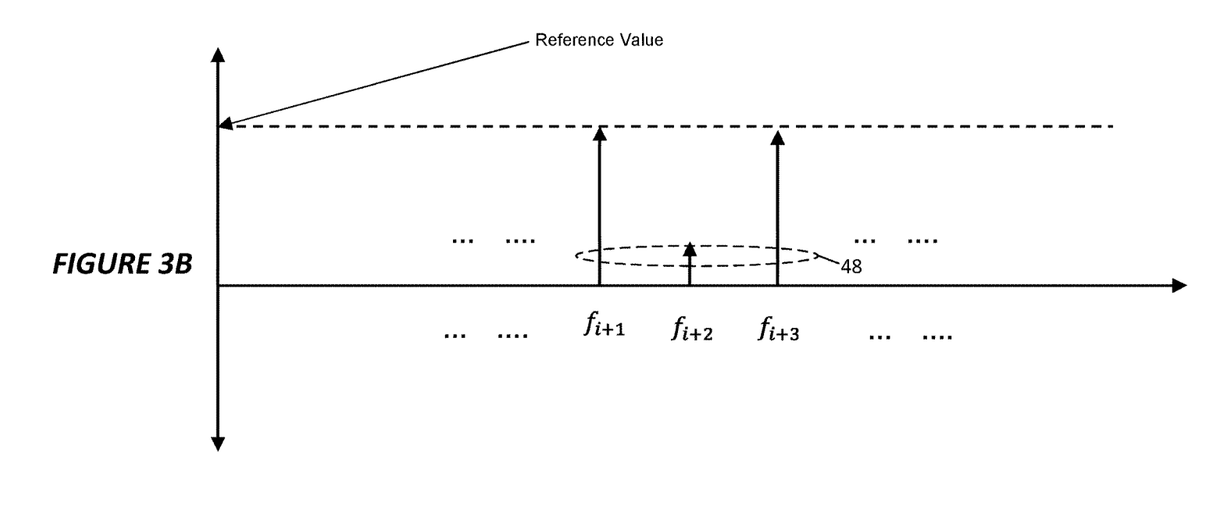

Conversely, FIG. 3B illustrates the same set of column values 48 but in a case where there is/was a touch input to the touch sensor 10 in the screen region corresponding to the column output signals 34 at the $f_{i+2}$ excitation-signal frequency. As shown, the column value 48 corresponding to the $f_{i+2}$ excitation-signal frequency is altered in amplitude relative to the other column values 48, e.g., those at the $f_{i+1}$ and $f_{i+3}$ excitation frequencies, and also altered relative to the nominal or reference value. One way to understand the illustration is to appreciate that the column values 48 will all have the same numeric value or will all have numeric values within a certain tolerance range if all the column input signals 24 have the same amplitude (within a tolerance range) and there are no touch inputs to the touch sensor 10.

Figure 4A:
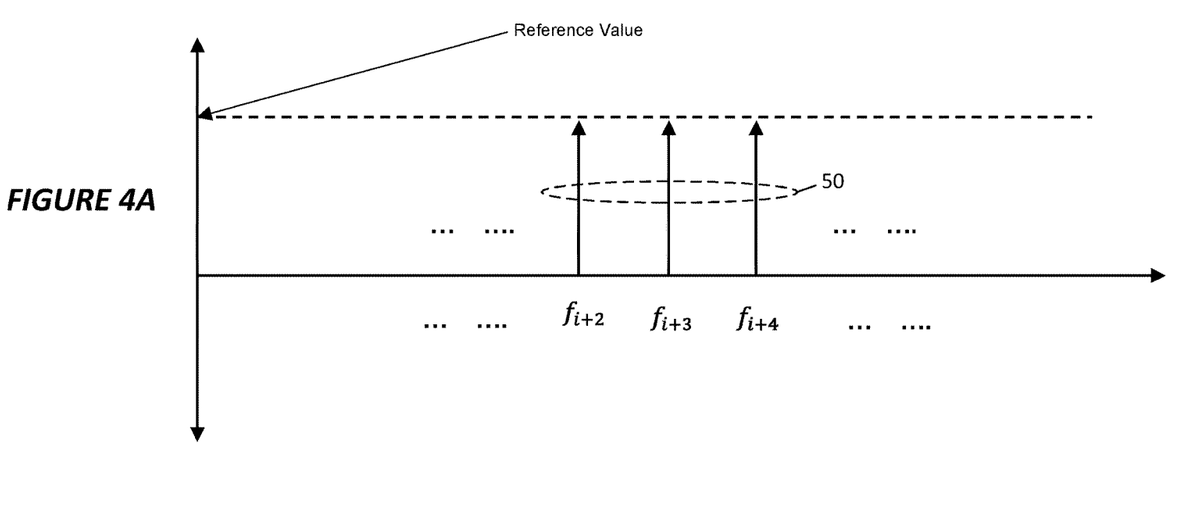
Figure 4B:
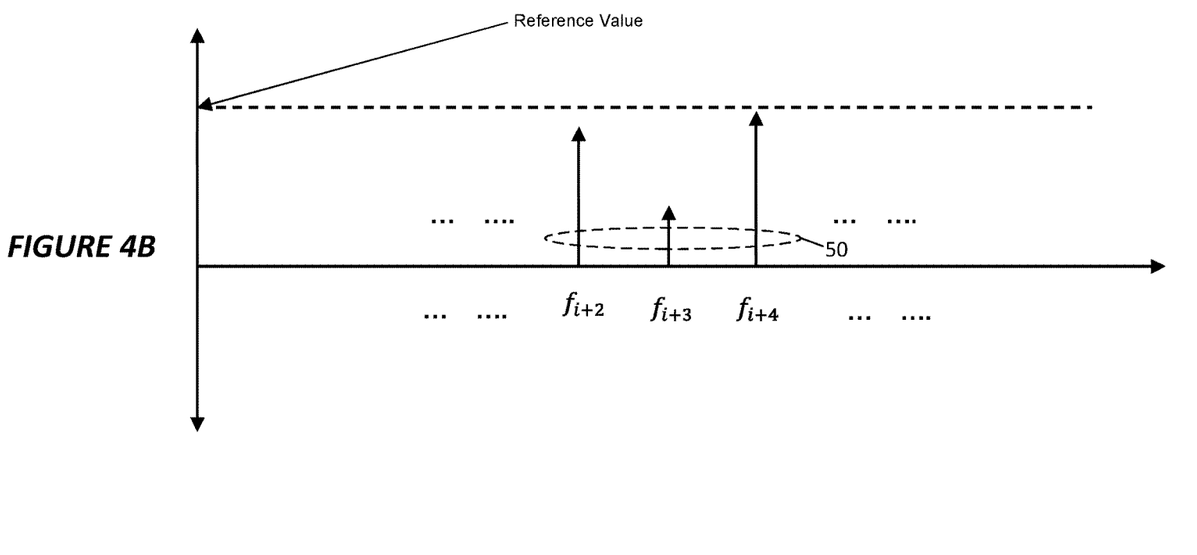

FIGS. 4A and 4B are like FIGS. 3A and 3B except that they depict row values 50. As such, to determine the location of a detected touch input, the processing circuitry 46 "correlates" the column values 48 with the row values 50, e.g., it identifies which column value(s) 48 deviate from the other column values 48 or from the applicable reference value and it identifies which row value(s) 50 deviate from the other row values 50 or from the applicable reference value, and it relates the identified column value(s) 48 to the identified row value(s) 50. In the example case represented by FIGS. 3A/3B and 4A/4B, the column value 48 for the $f_{i+2}$ excitation-signal frequency is deviated and the row value 50 for the $f_{i+3}$ excitation-signal frequency is deviated. For example, assuming that the second column 12 from the left of the touch sensor 10 in FIG. 2 is associated with the $f_{i+2}$ excitation-signal frequency and assuming that the third row 14 from the top of the touch sensor 10 in FIG. 2 is associated with the $f_{i+3}$ excitation-signal frequency, the deviations shown in FIGS. 3A/3B and 4A/4B represent a touch input at/near the intersection of the second column 12 and the third row 14.

For example, in an example capacitive-sensing implementation of the touch sensor 10, the capacitors used for sensing touch charge and discharge using an alternating voltage cycle. The frequency of charge and discharge is controlled via the supplied voltage—i.e., via the excitation signals applied as column input signals 24 on the column inputs 26 and the excitation signals applied as the row input signals 28 on the row inputs 30. Consider an example excitation-signal frequency of 40 KHz, resulting in the involved capacitors charging and discharging 40,000 times within one second or 4000 times within 0.1 second. A normal touch by a human takes between 0.2 and 0.3 seconds. Hence, there will be 8000-12,000 cycles with a lower amplitude overall than the "regular" no-touch case. That reduction will be reflected in the frequency component representing the involved capacitor line after taking the FFT—i.e., the numeric value of the involved column value 48 or row value 50 will reflect the reduced amplitude of the involved column output signal 34 or row output signal 40. Given a certain reference voltage/amplitude, e.g., the value(s) that apply when there are no touches, the "depth" and period of a touch input can be calculated via the processing circuitry 46.

Figure 5:
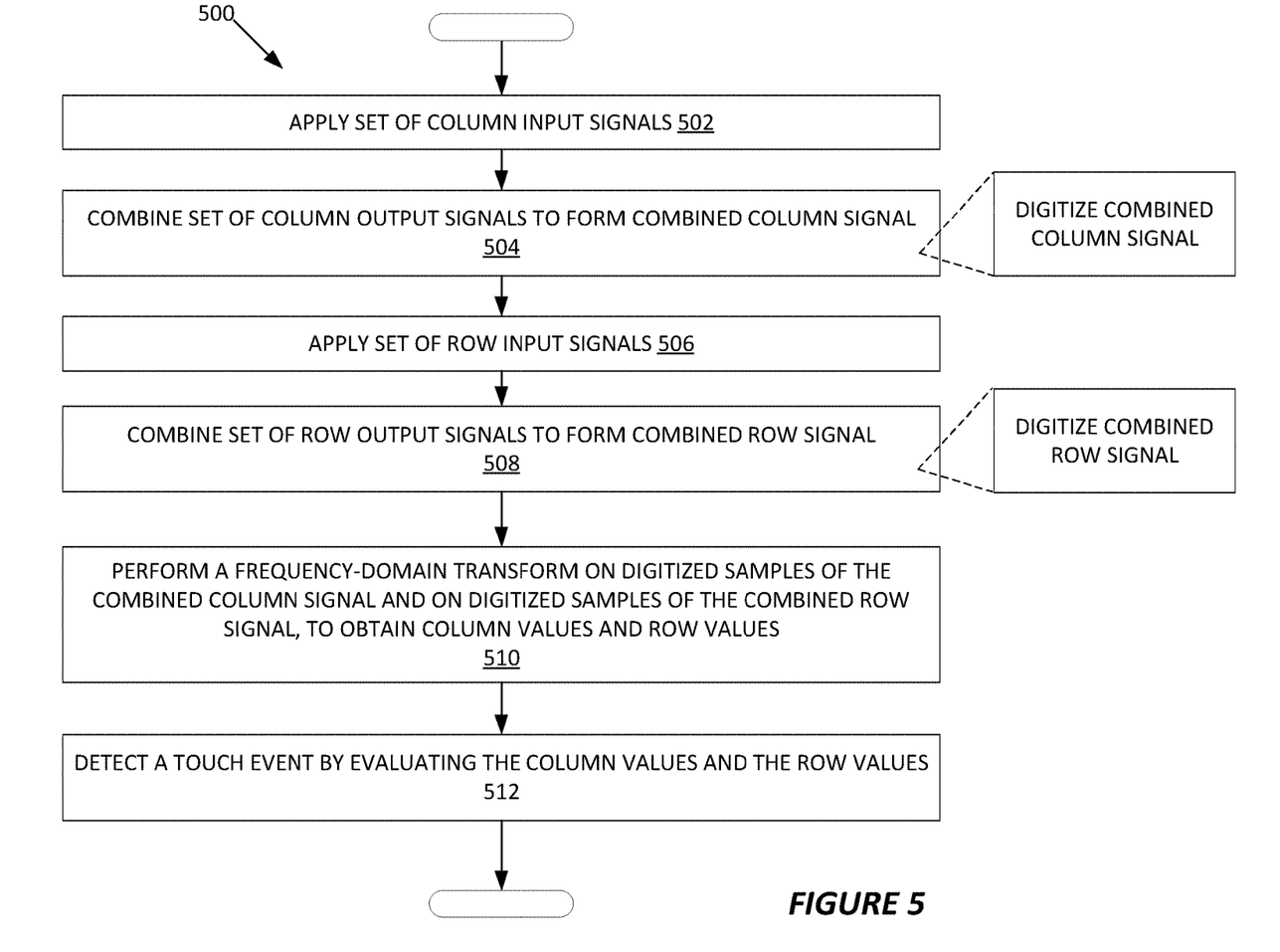
FIG. 5 is a logic flow diagram of a method of reading a touch sensor, according to one embodiment.

FIG. 5 illustrates one embodiment of a method 500 of reading a touch sensor, such as the touch sensor 10 shown in either FIG. 1 or FIG. 2. While the apparatus 20 of FIG. 2 may be configured to perform the method 500, the method 500 may be implemented by any circuitry arrangement that provides for reading the columns 12/rows 14 of the involved touch sensor, summing and digitizing the corresponding touch-sensor output signals, and performing the involved frequency-domain transforms and processing. Moreover, one or more "steps" or operations of the illustrated method 500 may be performed in an order other than that suggested by the illustration and/or may be performed in parallel or as part of a larger set of processing operations. For example, the rows 14 may be processed before the columns 12. Further, the method 500 may be repeated on a read-cycle basis, e.g., there may be repeating performances performed for periodic or repeated reading of the involved touch sensor.

Allowing for the above qualifications and understandings, an example method 500 of reading a touch sensor 10 having columns 12 and rows 14 forming a row-column grid includes: (a) applying (Block 502) a set of column input signals 24 simultaneously to respective column inputs 26 of the touch sensor 10, each column input signal 24 being an analog signal at a respective frequency; (b) combining (Block 504) column output signals 34 taken from respective column outputs 36 of the touch sensor 10 to form a combined column signal 38, each column output signal 34 corresponding to a respective one of the column input signals 24 but altered in amplitude in dependence on whether the touch sensor 10 is being touched in a vertical screen region corresponding to the respective column 12 of the touch sensor 10; (c) applying (Block 506) a set of row input signals 28 simultaneously to respective row inputs 30 of the touch sensor 10, each row input signal 28 being an analog signal at a respective frequency; (d) combining (Block 508) row output signals 40 taken from respective row outputs 42 of the touch sensor 10 to form a combined row signal 44, each row output signal 40 corresponding to a respective one of the row input signals 28 but altered in amplitude in dependence on whether the touch sensor 10 is being touched in a horizontal screen region corresponding to the respective row 14 of the touch sensor 10; (e) performing (Block 510) a frequency-domain transform on digitized samples of the combined column signal 38 and on digitized samples of the combined row signal 44, to obtain, respectively, a set of column values 48 that depend on the amplitudes of the column output signals 34 in the combined column signal 38, and a set of row values 50 that depend on the amplitudes of the row output signals 40 in the combined row signal 44; and (f) detecting (Block 512) a touch input to the touch sensor 10 by evaluating the column values 48 and the row values 50.

Evaluating the column values 48 and the row values 50 to detect the touch input comprises, for example, detecting deviations among the column values 48 and deviations among the row values 50. Detecting deviations among the column values 48 and deviations among the row values 50 comprises, for example, determining that one or more of the column values 48 deviate from a nominal column value or with respect to one or more other ones of the column values 48 and determining that one or more of the row values 50 deviate from a nominal row value or with respect to one or more other ones of the row values 50.

The method 500 in one or more embodiments includes applying the set of column input signals 24 during a first interval and correspondingly obtaining the digitized samples of the combined column signal 38, and applying the set of row input signals 28 during a second interval that does not overlap with the first interval and correspondingly obtaining the digitized samples of the combined row signal 44. The respective frequencies of the column input signals 24 may be distinct from the respective frequencies of the row input signals 28. With such an arrangement, in at least one embodiment of the method 500, performing (Block 510) the frequency-domain transform comprises buffering the digitized samples of the combined column signal 38 together with the digitized samples of the combined row signal 44 as an overall set of digitized samples, and performing an FFT on the overall set of digitized samples.

However, in at least one implementation, the respective frequencies of the column input signals 24 are the same as the respective frequencies of the row input signals 28. Correspondingly, in such implementations, performing (Block 510) the frequency-domain transform comprises performing a first FFT on the digitized samples of the combined column signal 38, and performing a second FFT on the digitized samples of the combined row signal 44. One example of applying (Block 502) the set of column input signals 24 and applying (Block 506) the set of row input signals 28 comprises multiplexing a common set of excitation signals 72 for application to the respective column inputs 26 during a first interval and application to the respective row inputs 30 during a second interval. A signal generator 70 generates the set of excitation signals 72, for example.

The method 500 may further include using a summing circuit 88 to form either the combined column signal 38 or the combined row signal 44, based on multiplexing either the column output signals 34 or the row output signals 40 into the summing circuit 88.

Still further, the method 500 may include reducing noise in the combined column signal 38 and in the combined row signal 44 using a chopper amplifier 82, in advance of obtaining the digitized samples of the combined column signal 38 and the digitized samples of the combined row signal 44. The chopper amplifier 82, if included, and the ADC 80 may be regarded as pre-processing and digitization circuitry 84.

In at least one embodiment, the method 500 includes an "adaptation" phase in which the apparatus 20 determines the frequencies to use for the set of excitation signals 72. "Determining" may be determining which frequencies to generate or choosing from among a larger set of predefined frequencies available from the signal generator 70. In either case, during the adaptation phase, the apparatus 20 performs FFT processing on digital samples of the combined column signal 38 and the combined row signal 44 without applying excitation signals to the columns 12 and rows 14 of the touch sensor 10. Such processing allows the apparatus 20 to detect frequency-specific "interference" in the output column signals 34 and/or the output row signals 40 and thereby adapt (choose) the excitation frequencies used for reading the touch sensor 10, to avoid using excitation frequencies that are in or near the frequencies or frequency ranges of the interference.

Figure 6:
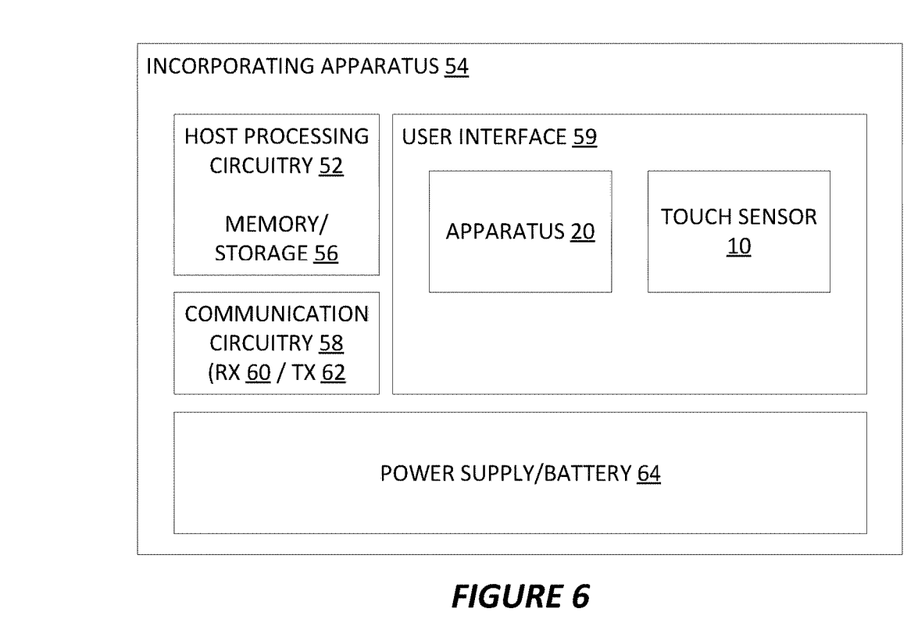
FIG. 6 is a block diagram of an incorporating apparatus that incorporates, for example, the apparatus of FIG. 2.

FIG. 6 illustrates an example arrangement of an incorporating apparatus 54 that incorporates an apparatus 20 for reading a touch sensor 10 included in the incorporating apparatus 54. In addition to the incorporating apparatus 54 including host processing circuitry 52 such as shown in FIG. 2, the incorporating apparatus 54 includes memory/storage 56, which comprises one or more types of computer-readable media for short and/or long-term storage, e.g., of computer programs, operating data, etc. The incorporating apparatus 54 further includes communication circuitry 58 comprising one or more receiver circuits 60 and one or more transmitter circuits 62, for supporting one or more transceiver operations. A user interface 59 of the incorporating apparatus 54 includes the touch sensor 10 and the interfacing apparatus 20, for example. Further, the incorporating apparatus 54 includes a power supply and/or battery 64 In one example, the incorporating apparatus 54 comprises a computing device, such as a laptop, tablet, or smartphone. In a particular example, the incorporating apparatus comprises a communication device that is configured for accessing a wireless communication network, e.g., a cellular network operating according to Third Generation Partnership Project (3GPP) specifications. As such, the communication circuitry 58 includes, for example, one or more radiofrequency transceivers.

Among the various advantages offered by the apparatus 20 shown and described herein by way of example is the reduction in the number of ADCs needed to read the involved touch sensor. Rather than having an ADC for every column/row line, the apparatus 20 may be configured with a single ADC 80 for digitizing the combined column signal 38 for reading the columns 12 of a touch sensor 10, with the same ADC 80 providing digitization of the combined row signal 44 for reading the rows 14 of the touch sensor 10. Having each of the column output signals 34 used to form the combined column signal 38 at a different tone (frequency) allows for separation in the frequency domain—e.g., the column values 48 obtained from the digitized samples of the combined column signal 38 represent the respective columns 12 of the touch sensor 10 and, hence, their values depend on whether there are touch inputs to the touch sensor 10 at any of the respective columns 12. The same arrangement/details hold for the row values 50.

If there are no touch inputs, then all the different frequency components have the same amplitude, within a tolerance range—i.e., with no touch inputs, all the column values 48 are the same, within a tolerance range, and all the row values 50 are the same, within the applicable tolerance range. If certain columns/rows of the touch sensor 10 were touched, then the amplitude(s) of the column value(s) 48 and the row values 50 corresponding to the touch locations would be altered in comparison to the other column/row values, e.g., lowered by an amount that depends on the touch "depth" or pressure. That is, the apparatus 20 can identify where the touch happened and for how long, based on evaluating the column values 48 and the row values 50 over one or more read cycles of the touch sensor 10. In this regard, the column values 48 can be understood as numeric values indicating the amplitudes of the respective column output signals 34 captured in the digitized samples of the combined column signal 38. Likewise, the row values 50 can be understood as numeric values indicating the amplitudes of the respective row output signals 40 captured in the digitized samples of the combined row signal 44. In this regard, the respective frequencies used for the column input signals 24 and the row input signals 28 may be spaced apart by an amount to provide adequate "frequency guard bands"—i.e., to ensure clear separability in the frequency domain as between the individual column values 48 and between the individual row values 50.

The apparatus 20 also offers significant cost advantages for increasing column/row counts because the larger column/row counts can be accommodated in the digital domain using a larger number of points in the FFT(s) used for the frequency-domain transforms. Of course, the first and second multiplexing circuitry 22 and 32 must be able to accommodate the involved numbers of columns 12 and rows 14, but such changes have minimal impact on the underlying design which scales up or down nicely, for different column/row counts. Further, the touch-sensor interfacing/reading technique embodied in the method 500 and in the apparatus 20 provides potentially higher sensitivity as compared to conventional arrangements that use per-row and per-column scanning, because the touch "strength" or pressure can be accurately detected. Still further, the technique easily accommodates an increase of the framerate—the read-cycle periodicity of the touch sensor 10—and that provides more frequent touch readings to the host processing circuitry 52 and, correspondingly, more fluid touch responsiveness.

Figure 7:
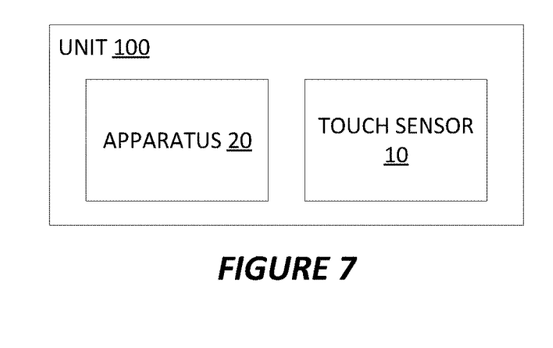
FIG. 7 is a block diagram of a unit according to one embodiment, where the unit includes a touch sensor and an apparatus for reading the touch sensor.

FIG. 7 depicts a "unit" or assembly 100 that includes a touch sensor 10 and an apparatus 20 configured for reading the touch sensor 10. For example, the unit 10 comprises a capacitive touch screen as the touch sensor 10 and includes an apparatus 20 like the one introduced in FIG. 2, for reading the capacitive touch screen. Of course, other types or variations of touch sensor may be included in the unit 100, which may be provided for incorporation into various types of electronic systems or devices.

Figure 8:
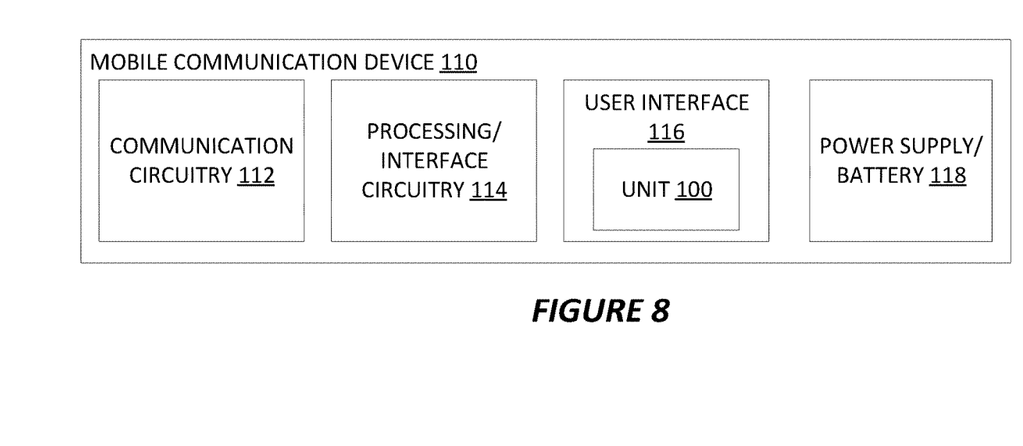
FIG. 8 is a block diagram of a mobile communication device according to one embodiment, where the mobile communication device includes a unit that includes a touch sensor and an apparatus for reading the touch sensor.

FIG. 8 illustrates one example of incorporation, where the unit 100 forms a part of a mobile communication device 110. As an example, the mobile communication device 100 may be understood as another example or variation of the incorporating apparatus 54 introduced in FIG. 6. In the illustrated embodiment, the mobile communication device 110 includes communication circuitry 112, processing and interface circuitry 114, a user interface 116 that includes the unit 100, and a power supply and/or battery 118.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of reading a touch sensor having columns and rows forming a row-column grid, the method comprising:
   applying a set of column input signals simultaneously to respective column inputs of the touch sensor, each column input signal being an analog signal at a respective frequency;
   combining column output signals taken from respective column outputs of the touch sensor to form a combined column signal, each column output signal corresponding to a respective one of the column input signals but altered in amplitude in dependence on whether the touch sensor is being touched in a vertical screen region corresponding to the respective column of the touch sensor;
   applying a set of row input signals simultaneously to respective row inputs of the touch sensor, each row input signal being an analog signal at a respective frequency;
   combining row output signals taken from respective row outputs of the touch sensor to form a combined row signal, each row output signal corresponding to a respective one of the row input signals but altered in amplitude in dependence on whether the touch sensor is being touched in a horizontal screen region corresponding to the respective row of the touch sensor;
   performing a frequency-domain transform on digitized samples of the combined column signal and on digitized samples of the combined row signal, to obtain, respectively, a set of column values that depend on the amplitudes of the column output signals in the combined column signal, and a set of row values that depend on the amplitudes of the row output signals in the combined row signal; and
   detecting a touch input to the touch sensor by evaluating the column values and the row values.

2. The method of claim 1, wherein evaluating the column values and the row values to detect the touch input comprises detecting deviations among the column values and deviations among the row values.

3. The method of claim 2, wherein detecting deviations among the column values and deviations among the row values comprises determining that one or more of the column values deviate from a nominal column value or with respect to one or more other ones of the column values and determining that one or more of the row values deviate from a nominal row value or with respect to one or more other ones of the row value.

4. The method of claim 1, wherein the method includes applying the set of column input signals during a first interval and correspondingly obtaining the digitized samples of the combined column signal, and applying the set of row input signals during a second interval that does not overlap with the first interval and correspondingly obtaining the digitized samples of the combined row signal.

5. The method of claim 4, wherein the respective frequencies of the column input signals are distinct from the respective frequencies of the row input signals, and wherein performing the frequency-domain transform comprises buffering the digitized samples of the combined column signal together with the digitized samples of the combined row signal as an overall set of digitized samples and performing a single Fast Fourier Transform (FFT) on the overall set of digitized samples.

6. The method of claim 4, wherein the respective frequencies of the column input signals are the same as the respective frequencies of the row input signals, and wherein performing the frequency-domain transform comprises performing a first Fast Fourier Transform (FFT) on the digitized samples of the combined column signal and performing a second FFT on the digitized samples of the combined row signal.

7. The method of claim 6, wherein applying the set of column input signals and applying the set of row input signals comprises multiplexing a common set of excitation signals for application to the respective column inputs during a first interval and application to the respective row inputs during a second interval.

8. The method of claim 1, further comprising using a summing circuit to form either the combined column signal or the combined row signal, based on multiplexing either the column output signals or the row output signals into the summing circuit.

9. The method of claim 1, further comprising reducing noise in the combined column signal and in the combined row signal using a chopper amplifier, in advance of obtaining the digitized samples of the combined column signal and the digitized samples of the combined row signal.

10. An apparatus configured for reading a touch sensor having columns and rows forming a row-column grid, the apparatus comprising:
   first multiplexing circuitry configured to:
      apply a set of column input signals simultaneously to respective column inputs of the touch sensor, each column input signal being an analog signal at a respective frequency; and
      apply a set of row input signals simultaneously to respective row inputs of the touch sensor, each row input signal being an analog signal at a respective frequency;
   second multiplexing circuitry configured to:
      combine column output signals taken from respective column outputs of the touch sensor to form a combined column signal, each column output signal corresponding to a respective one of the column input signals but altered in amplitude in dependence on whether the touch sensor is being touched in a vertical screen region corresponding to the respective column of the touch sensor; and combine row output signals taken from respective row outputs of the touch sensor to form a combined row signal, each row output signal corresponding to a respective one of the row input signals but altered in amplitude in dependence on whether the touch sensor is being touched in a horizontal screen region corresponding to the respective row of the touch sensor; and processing circuitry configured to:

perform a frequency-domain transform on digitized samples of the combined column signal and on digitized samples of the combined row signal, to obtain, respectively, a set of column values that depend on the amplitudes of the corresponding column output signals in the combined column signal, and a set of row values that depend on the amplitude of the corresponding row output signals in the combined row signal; and detect a touch input to the touch sensor by evaluating the column values and the row values.

11. The apparatus of claim 10, wherein the processing circuitry is configured to interface with host processing circuitry of an incorporating apparatus that incorporates the touch sensor and the apparatus.

12. The apparatus of claim 10, wherein the processing circuitry is configured to evaluate the column values and the row values to detect the touch input by detecting deviations among the column values and deviations among the row values.

13. The apparatus of claim 12, wherein, to detect deviations among the column values and deviations among the row values, the processing circuitry is configured to determine that one or more of the column values deviate from a nominal column value or with respect to one or more other ones of the column values and determine that one or more of the row values deviate from a nominal row value or with respect to one or more other ones of the row values.

14. The apparatus of claim 10, wherein the processing circuitry includes a Fast Fourier Transform (FFT) circuit configured to perform the frequency-domain transform as one or more FFTs, and further includes a computer processor that integrates or is otherwise operatively coupled to the FFT circuit and is configured to evaluate the column values and the row values generated by the FFT circuit.

15. The apparatus of claim 10, wherein the first multiplexing circuitry is configured to apply the set of column input signals during a first interval and correspondingly obtain the digitized samples of the combined column signal via an analog-to-digital converter (ADC) of the apparatus and apply the set of row input signals during a second interval that does not overlap with the first interval and correspondingly obtain the digitized samples of the combined row signal via the ADC.

16. The apparatus of claim 15, wherein the respective frequencies of the column input signals are distinct from the respective frequencies of the row input signals, and wherein, to perform the frequency-domain transform, the processing circuitry is configured to buffer the digitized samples of the combined column signal in a buffer together with the digitized samples of the combined row signal as an overall set of digitized samples, and perform a single Fast Fourier Transform (FFT) on the overall set of digitized samples.

17. The apparatus of claim 15, wherein the respective frequencies of the column input signals are the same as the respective frequencies of the row input signals, and wherein, to perform the frequency-domain transform, the processing circuitry is configured to perform a first Fast Fourier Transform (FFT) on the digitized samples of the combined column signal and perform a second FFT on the digitized samples of the combined row signal.

18. The apparatus of claim 15, wherein the first multiplexing circuitry is configured to apply the set of column input signals and apply the set of row input signals by multiplexing a common set of excitation signals for application to the respective column inputs during a first interval and application to the respective row inputs during a second interval.

19. The apparatus of claim 10, wherein the second multiplexing circuitry includes or is associated with a summing circuit that is configured to form either the combined column signal or the combined row signal, based on multiplexing either the column output signals or the row output signals into the summing circuit.

20. The apparatus of claim 10, further comprising a chopper amplifier configured to reduce noise in the combined column signal and in the combined row signal, in advance of obtaining the digitized samples of the combined column signal and the digitized samples of the combined row signal.

21. A unit comprising a touch sensor and the apparatus of claim 10, for reading the touch sensor.

22. A mobile communication device comprising the unit of claim 21.

* * * * *